(12) United States Patent
Sugawara et al.

(10) Patent No.: US 12,236,113 B2
(45) Date of Patent: Feb. 25, 2025

(54) INFORMATION PROCESSING APPARATUS AND CONTROL METHOD FOR CONTROLLING EXECUTION OF GARBAGE COLLECTION

(71) Applicant: Lenovo (Beijing) Limited, Beijing (CN)

(72) Inventors: Takashi Sugawara, Kanagawa (JP); Tingting Zhang, Kanagawa (JP)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 18/365,221

(22) Filed: Aug. 4, 2023

(65) Prior Publication Data
US 2024/0061594 A1 Feb. 22, 2024

(30) Foreign Application Priority Data
Aug. 17, 2022 (CN) .......................... 202210985538.7

(51) Int. Cl.
*G06F 3/06* (2006.01)
*G06F 1/26* (2006.01)
*G06F 1/3234* (2019.01)

(52) U.S. Cl.
CPC ............ *G06F 3/0625* (2013.01); *G06F 1/263* (2013.01); *G06F 1/3275* (2013.01);
(Continued)

(58) Field of Classification Search
CPC ........ G06F 1/206; G06F 1/263; G06F 1/3212; G06F 1/3275; G06F 3/0608;
(Continued)

(56) References Cited

U.S. PATENT DOCUMENTS

| 2016/0225459 A1 | 8/2016 | Boysan et al. |
| 2017/0168930 A1* | 6/2017 | Choi ..................... G06F 3/0659 |
| 2022/0164283 A1 | 5/2022 | Mauro et al. |

FOREIGN PATENT DOCUMENTS

| JP | 2004-178417 A | 6/2004 |
| JP | 2019-199059 A | 11/2019 |

(Continued)

*Primary Examiner* — Larry T MacKall
(74) *Attorney, Agent, or Firm* — Osha Bergman Watanabe & Burton LLP

(57) ABSTRACT

An information processing apparatus includes a power circuit, a first controller, and a solid-state memory. The solid-state memory includes a second controller and a storage medium. The power circuit supplies operating power to a constituent member, selects a first power supply mode for converting supplied power into operating power when power is supplied from an external power source, and selects a second power supply mode for converting power from a secondary battery into the operating power when AC power is not supplied from an external power source. The second controller executes garbage collection for the storage medium regardless of an operation mode notified from the first controller when the first power supply mode is selected and determines whether garbage collection for the storage medium is necessary when the second power supply mode is selected and a change to a power saving mode is instructed as the operation mode.

8 Claims, 6 Drawing Sheets

(52) U.S. Cl.
CPC .......... *G06F 3/0608* (2013.01); *G06F 3/0652* (2013.01); *G06F 3/0679* (2013.01)

(58) Field of Classification Search
CPC .... G06F 3/0625; G06F 3/0652; G06F 3/0679; G06F 12/0246; G06F 2212/7205; G11C 16/30; H02J 7/0048; H02J 7/0063; Y02D 10/00

See application file for complete search history.

(56) References Cited

FOREIGN PATENT DOCUMENTS

| | | |
|---|---|---|
| JP | 2020-13271 A | 1/2020 |
| JP | 2020-46752 A | 3/2020 |
| JP | 2020-71632 A | 5/2020 |
| JP | 2021-40184 A | 3/2021 |
| JP | 2021-163328 A | 10/2021 |

* cited by examiner

INFORMATION PROCESSING APPARATUS AND CONTROL METHOD FOR CONTROLLING EXECUTION OF GARBAGE COLLECTION

CROSS-REFERENCE TO RELATED APPLICATIONS

This application claims priority to Chinese Patent Application No. 202210985538.7 filed on Aug. 17, 2022, the contents of which are hereby incorporated herein by reference in their entirety.

BACKGROUND OF THE INVENTION

Field of the Invention

The present invention relates to an information processing apparatus and a control method, e.g., an auxiliary storage device provided in an information processing apparatus.

Description of the Related Art

Some information processing apparatuses such as a personal computer (PC) are provided with solid-state storage devices (SSDs: Solid State Drives) as auxiliary storage devices. An SSD is a storage device provided with a nonvolatile semiconductor memory. A NAND flash memory is mainly used as a semiconductor memory provided in an SSD. Therefore, the access speed is higher and the power consumption is lower, as compared with hard disk drives (HDD), which have conventionally been in widespread use.

A NAND flash memory (which may be referred to as "NAND memory" in the present application) includes a plurality of blocks and page registers, and is configured as a memory array in which individual blocks are stacked. Each block is accessed in units of pages. Further, each block also has a capacity that enables a plurality of pages of data to be stored.

Data is written from a host to a NAND memory in an unused block. However, data is not written to a block in which valid data (which may be referred to as "valid data" in the present application) is stored, even if the valid data is stored in only one page. Further, data erased from the NAND memory is left as invalid data in units of pages, which is a finer unit than units in blocks. No new data is allowed to be written to a block with invalid data left. Repetitive reading and writing of data inconveniently increase the number of blocks that cannot be used regardless of the presence or absence of valid data. Invalid data prevents new data from being stored. Thus, invalid data is also referred to as garbage.

Therefore, an SSD controller executes garbage collection (GC) to make effective use of the NAND memory. The GC includes processing of duplicating and concentrating valid data from a storage block to an unused block, processing of duplicating and concentrating invalid data to another unused block, and processing of releasing, as free space, blocks in which only invalid data remains (block erase).

The GC may be executed in the background in parallel with reading and writing data. The GC executed in the background is particularly referred to as background garbage collection (BGC). Executing the BGC may lead to degradation of SSD performance, e.g., access speed. Therefore, in order to fulfill the performance of the SSD, the BGC may be executed when a host operating state is in a standby state (idle state), and the execution of the BGC may be restricted when the host operating state is active (active state).

[Patent Document 1] Japanese Unexamined Patent Application Publication No. 2019-199059

However, the BGC consumes a relatively large amount of power. The power consumption related to the BGC is frequently equal to or greater than the power consumption required to execute an application program (which may be referred to as "app" in the present application). Therefore, the BGC can affect battery life. For example, when power is not supplied from an external power source, or when an application with a relatively small amount of processing is executed, stored power may be used up regardless of user's intention.

SUMMARY OF THE INVENTION

An information processing apparatus according to a first aspect of the present invention includes: a power circuit; and another constituent member, the constituent member including at least a first controller and a solid-state memory, and the solid-state memory including a second controller and a storage medium, wherein the power circuit supplies operating power, which is power used to operate the constituent member, the power circuit selects a first power supply mode for converting the power into the operating power in the case where power is supplied from an external power source, and selects a second power supply mode for converting power from a secondary battery into the operating power in the case where power is not supplied from an external power source, the second controller executes garbage collection for the storage medium regardless of an operation mode notified from the first controller in the case where the first power supply mode is selected, and determines whether garbage collection for the storage medium is necessary in the case where the second power supply mode is selected and a change to a power saving mode, which is an operation mode having less power consumption than standard power consumption, is instructed as the operation mode.

In the above-described information processing apparatus, the second controller may determine whether garbage collection for the storage medium is necessary on the basis of a capacity of free space of the storage medium in the case where the second power supply mode is selected.

In the above-described information processing apparatus, the solid-state memory may include a temperature sensor detecting a temperature of the solid-state memory, and the second controller may estimate, on the basis of the temperature, whether the first power supply mode or the second power supply mode has been selected.

In the above-described information processing apparatus, in the case where the second power supply mode is selected and a remaining capacity of the secondary battery is notified from the first controller, the second controller may determine whether garbage collection is necessary on the basis of the remaining capacity.

In the above-described information processing apparatus, the second controller may determine that garbage collection is unnecessary in the case where the remaining capacity is less than a predetermined remaining capacity lower limit.

In the above-described information processing apparatus, the second controller may determine that garbage collection is unnecessary in the case where the remaining capacity is equal to or more than the predetermined remaining capacity lower limit and the capacity of free space of the solid-state memory is equal to or more than a predetermined capacity lower limit, and may determine that garbage collection is necessary in the case where the remaining capacity is equal to or more than the remaining capacity lower limit and the capacity of the free space is less than the capacity lower limit.

In the above-described information processing apparatus, the first controller is a processor of a host system, and may notify the second controller of a power supply mode of the power circuit and the remaining capacity of the secondary battery.

In the above-described information processing apparatus, the first controller is a controller separate from a processor of a host system, and may notify the second controller of a power supply mode of the power circuit and the remaining capacity of the secondary battery.

A control method according to a second aspect of the present invention is a control method in an information processing apparatus including a power circuit and an other constituent member, the constituent member including at least a first controller and a solid-state memory, and the solid-state memory including a second controller and a storage medium, the control method executing: a first step in which the power circuit supplies operating power used to operate the constituent member, the power circuit selects a first power supply mode for converting the power into the operating power in the case where power is supplied from an external power source, and selects a second power supply mode for converting power from a secondary battery into the operating power in the case where power is not supplied from an external power source; and a second step in which the second controller executes garbage collection for the storage medium regardless of an operation mode notified from the first controller in the case where the first power supply mode is selected, and determines whether garbage collection for the storage medium is necessary in the case where the second power supply mode is selected and a change to a power saving mode, which is an operation mode having less power consumption than standard power consumption, is instructed as an operation mode.

According to one or more embodiments of the present invention, the impact of BGC on battery life can be reduced or eliminated.

DETAILED DESCRIPTION OF THE INVENTION

Figure 1:
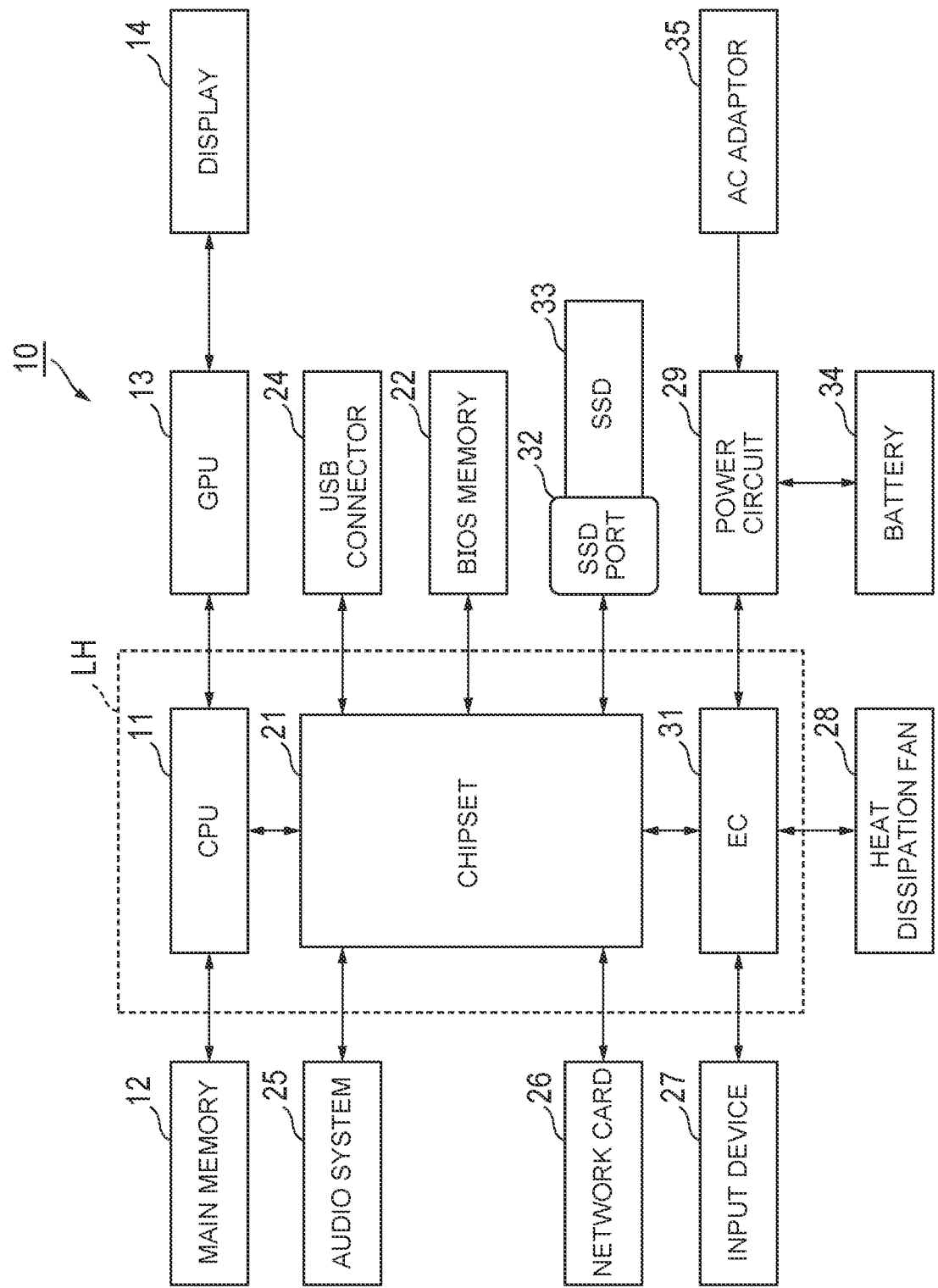
FIG. 1 is a schematic block diagram illustrating a hardware configuration of an information processing apparatus according to one or more embodiments.

The following will describe one or more embodiments of the present invention with reference to the accompanying drawings. First, an overview of an information processing apparatus 10 according to one or more embodiments of the present invention will be given. FIG. 1 is a schematic block diagram illustrating the hardware configuration of the information processing apparatus 10 according to one or more embodiments. Although the following description will mainly focus on the case where the information processing apparatus 10 is a laptop personal computer (PC), the present invention is not limited thereto. The information processing apparatus 10 may be implemented in any form such as a desktop PC, a tablet terminal device, a multi-functional mobile phone (smartphone), or the like.

The information processing apparatus 10 includes a CPU (Central Processing Unit) 11, a main memory 12, a GPU (Graphic Processing Unit) 13, a display 14, a chipset 21, a BIOS (Basic Input Output System) memory 22, a USB (Universal Serial Bus) connector 24, an audio system 25, a network card 26, an input device 27, a heat dissipation fan 28, a power circuit 29, an EC (Embedded Controller) 31, an SSD port 32, an SSD 33, a battery 34, and an AC (Alternating Current) adaptor 35.

The CPU 11 is a processor that executes programs stored in the main memory 12 to perform various types of arithmetic processing thereby to implement and control the operation of each section of the information processing apparatus 10. In the present application, "executing a program" or "execution of a program" refers to the execution of processing indicated by instructions described in a program.

The main memory 12 is a main storage device that functions as a work area for processing executed by the CPU 11. The main memory 12 stores programs executed by the CPU 11, data used in processing executed by the CPU 11, data generated from processing by the CPU 11, and the like. The data stored in the main memory 12 may also include intermediate data that is generated by certain processing and may be used by subsequent processing. The programs executed by the CPU 11 include, for example, an OS (Operating System), various drivers for operating hardware such as peripheral devices, various services/utilities, application programs, and the like. The main memory 12 includes one or a plurality of DRAMs (Dynamic Random Access Memories).

The GPU 13 executes processing related to image display (drawing) under the control of the CPU 11. The GPU 13 is a processor that includes a video memory and has functions related to image display under the control of the CPU 11. The GPU 13 processes drawing commands output from the CPU 11 and writes obtained drawing information into the video memory. The GPU 13 reads the newly written drawing information from the video memory and outputs the read drawing information to the display 14 as drawing data (display data).

The display 14 displays a display screen on the basis of the drawing data (display data) input from the GPU 13. The display 14 is, for example, a liquid crystal display.

The chipset 21 includes a bus controller for wired connection of various equipment (devices). The chipset 21 uses, for example, a PCIe (registered trademark) (Peripheral Component Interconnect Express) bus for connection. The chipset 21 uses the PCIe (registered trademark) to make at least each of the CPU 11, the GPU 13, and the EC 31 connectable to the SSD 33 via the SSD port 32. The chipset 21 may use one type or a plurality of types of methods, such as a USB, a serial ATA (AT Attachment), an SPI (Serial Peripheral Interface) bus, a PCI (Peripheral Component Interconnect) bus, and an LPC (Low Pin Count) bus to enable connection with other devices. The bus controller controls input/output of data with respect to devices connected according to individual methods.

In the example of FIG. 1, the chipset 21 is connected to the BIOS memory 22, the USB connector 24, the audio system 25, the network card 26, the EC 31, and the SSD port 32 as the peripheral devices. The CPU 11, the main memory 12, and the chipset 21 function as host devices. The host devices are the minimum hardware in the computer system of the information processing apparatus 10.

The BIOS memory 22 is configured to include a nonvolatile memory that stores system firmware. An EEPROM (Electrically Erasable Programmable Read Only Memory), a flash ROM, or the like is used as the nonvolatile memory. The system firmware is a program that is involved in the operation of the entire computer system and provides an interface between the hardware and various programs executed in the host devices. The system firmware is, for example, a BIOS (Basic Input/Output System). In the present application, such system firmware may be generically referred to as "BIOS."

The USB connector 24 is an interface for detachably connecting peripheral devices by using a USB. The USB connector 24 is installed by being fixed to the chassis of the information processing apparatus 10.

The audio system 25 is a device that enables inputting/outputting, recording, and reproducing of audio data.

The network card 26 connects to a network and enables wired or wireless data communication. The network card 26 may be configured to be connectable to other devices directly using a wireless LAN (Local Area Network) or via another network.

The SSD port 32 is an interface that enables connection with the SSD 33. The number of the SSD port 32 is one in the example of FIG. 1, but may be two or more. The SSD 33 may be connected to each of two or more SSD ports 32.

The SSD 33 is an auxiliary storage device that includes a nonvolatile semiconductor memory to store various types of data and programs. A NAND memory, for example, is used as the nonvolatile memory. The programs stored in the SSD 33 include an OS, drivers, services/utilities, application programs, and the like. The SSD 33 may have a built-in or attached temperature sensor that measures its own temperature. The SSD 33 transmits temperature data indicating a measured temperature as the temperature of the SSD to the CPU 11 or the EC 31 via the SSD port 32. The SSD 33 may also be referred to as a semiconductor drive, a memory drive, or the like. The SSD 33 is further provided with a controller. The controller controls the reading and writing of various types of data between a logical host LH and the nonvolatile memory, and the execution of garbage collection.

The control of garbage collection will be described later. In the present application, the logical host LH refers to a device or a set of devices that read and write various types of data directly or indirectly to and from the SSD 33. The logical host LH includes the CPU 11, the main memory 12, and the chipset 21 as the host devices constituting the main computer system (host system) of the information processing apparatus 10. The logical host LH may also include the EC 31 in addition to the host devices. In the present application, a controller constituting a host device and a controller provided in the SSD 33 may be distinguished by referring to these two as the "first controller" and the "second controller," respectively. The second controller is, for example, a SoC (System-on-a-Chip). The data stored to be accessible from the logical host LH may be referred to as "user data."

The EC 31 is a microcomputer that monitors and controls the states of various devices (peripheral devices, sensors, and the like) independently of the operating state (operation mode) of the information processing apparatus 10. The EC 31 is configured in the form of a one-chip microcomputer (not illustrated) provided with, for example, a CPU, a ROM, a RAM, a multi-channel A/D (Analog to Digital) input terminal, a D/A (Digital to Analog) output terminal, a timer, and a digital input/output terminal. Connected to the digital input/output terminal are, for example, the input device 27, the heat dissipation fan 28, and the power circuit 29.

The EC 31 executes predetermined firmware (which may be referred to as "ECFW" in the present application) that is separate from system firmware, thereby performing the functions thereof. The EC 31 has a temperature control function and a power control function. The temperature control function includes a function for acquiring the SSD temperature data indicating the temperature of the SSD 33 as the SSD temperature, and a function for controlling the operation of the heat dissipation fan 28 on the basis of the SSD temperature data. The amount of heat dissipated from the SSD 33 is controlled by the control of the heat dissipation fan 28. The power control function is a function for controlling the power circuit 29 in supplying power to be consumed by each section of the information processing apparatus 10. The EC 31 controls supply power to be supplied to, for example, the CPU 11 and the GPU 13.

The input device 27 accepts user operations, and outputs operation signals based on the accepted operations to the EC 31. Various types of information or commands are indicated by the operation signals. The input device 27 may be any one of, for example, a keyboard, a touchpad, a pointing device, and the like.

The heat dissipation fan 28 is configured to include a fan and an electric motor (motor). An amount of power to be supplied to the electric motor is controlled by the EC 31, and the electric motor rotates the fan at a speed based on the amount of supplied power. The airflow generated by the rotation of the fan promotes heat dissipation from the SSD 33. The heat dissipation from the SSD 33 raises the temperature of air drawn into the surroundings of the SSD 33 from the outside of the information processing apparatus 10. The air having the increased temperature is exhausted to the outside of the information processing apparatus 10.

The power circuit 29 supplies power required for operating each section of the information processing apparatus 10 under the control of the EC 31. The power circuit 29 includes, for example, a charging/discharging unit and a DC (Direct Current)/DC converter. The charging/discharging unit supplies power supplied from the AC adaptor 35 to the DC/DC converter when power supply from the AC adaptor 35 is detected. Of the power supplied from the AC adaptor 35, the power that remains unconsumed is charged to the battery 34. The charging/discharging unit supplies power discharged from the battery 34 to the DC/DC converter when power supply from the AC adaptor 35 is not detected.

The DC/DC converter converts the voltage of the power supplied to itself into the operating voltage of a member to which the power is to be supplied, and supplies the power of the converted voltage to that member.

Based on the power control information input from the EC 31, whether the operation of each member is necessary may be controlled, and the operating voltage of a member required to be operated may be set in the power circuit 29. For example, based on the power control information, operating voltages corresponding to the operation modes of the CPU 11 and the GPU 13, which constitute the host devices, may be informed as the operating voltages of the CPU 11 and GPU 13. A power state specified by, for example, PCIe (registered trademark), ACPI (Advanced Configuration and Power Interface) or the like may be applied as the operation mode. Further, the operating voltages for members to be operated regardless of the operation mode, e.g., the EC 31 and the input device 27, may be set beforehand in the power circuit 29.

The power circuit 29 outputs a power state signal, which indicates whether power is being supplied from the AC adaptor 35, to the EC 31. The power circuit 29 measures the potential difference between the positive terminal and the negative terminal of the battery 34 as an electromotive force, and outputs an electromotive force signal indicating the measured electromotive force to the EC 31. The electromotive force is used to estimate the remaining battery level of the battery 34.

In the present application, a power supply mode in which AC power from an external power source is converted into operating power may be referred to as the "first power supply mode." The first power supply mode may be referred to also as "AC mode." A power supply mode in which DC power from the battery is converted into operating power may be referred to as the "second power supply mode." The second power supply mode may be referred to as the "battery mode." A power state signal can also be regarded as a signal that carries information notifying a power supply mode.

The battery 34 is a secondary battery that stores power supplied from the charging/discharging unit of the power circuit 29. The battery 34 discharges stored power and supplies the discharged power to the charging/discharging unit. The battery 34 is, for example, a lithium ion battery.

The AC adaptor 35 converts the AC power supplied from an external power source (e.g., commercial power source) into DC power having a given voltage, and supplies the converted DC power to the power circuit 29.

Figure 2:
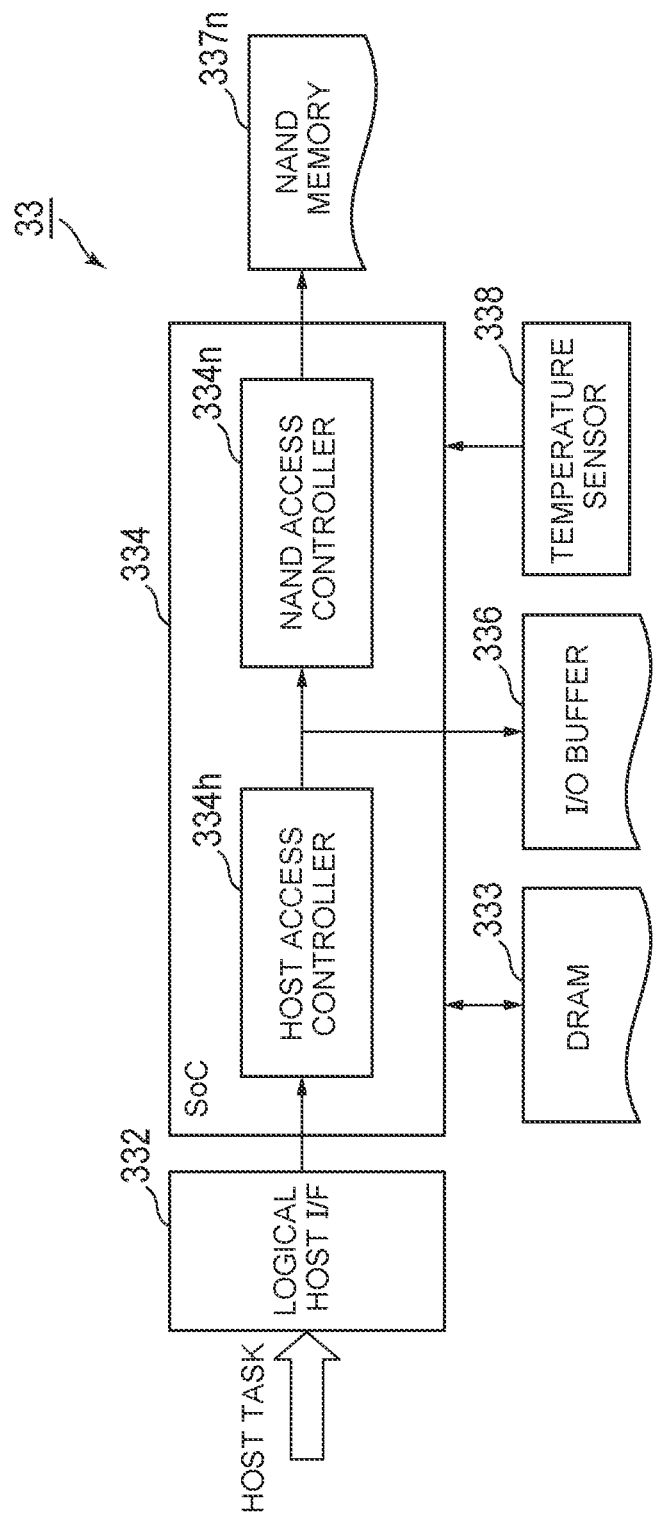
FIG. 2 is a schematic block diagram illustrating a functional configuration example of an SSD according to one or more embodiments.

A description will now be given of the functional configuration example of the SSD 33 according to one or more embodiments. FIG. 2 is a schematic block diagram illustrating the functional configuration example of the SSD 33 according to one or more embodiments.

The SSD 33 includes a logical host IF (interface) 332, a DRAM (Dynamic Random Access Memory) 333, a SoC 334, an I/O buffer 336, a NAND memory 337*n*, and a temperature sensor 338. In the example of FIG. 2, the SoC 334 corresponds to the second controller.

The logical host IF 332 is an input/output interface that connects the logical host LH and the SoC 334 to enable input/output of various types of data therebetween.

The DRAM 333 is an example of a volatile memory used as a storage device forming a working area of the SoC 334. The DRAM 333 stores, for example, a mapping table indicating the correspondence relationship between a logical address and a physical address for each page of the NAND memory 337*n*. Further, each time information indicating the operating state of the SoC 334 or the state of a resource is changed, the information is stored in the DRAM 333, and accumulated information is formed as a firmware log. The firmware log includes information of, for example, the commands provided to individual modules, the execution states of those commands, the resource states associated with command execution, and the like, thus forming an operation log indicating the operating state of the SSD 33.

The I/O buffer 336 is a memory used as a buffer (cache) in the input/output of data to/from the NAND memory 337*n*.

The temperature sensor 338 is housed inside the chassis of the SSD 33, and detects the temperature at the installed location as the SSD temperature. The temperature sensor 338 may be attached to the surface of the SSD 33. The temperature sensor 338 outputs temperature data indicating the detected SSD temperature to the SoC 334.

The NAND memory 337*n* is an example of a nonvolatile memory storing various types of data. The NAND memory 337*n* is provided with a plurality of blocks, and is configured to include the blocks. In the NAND memory 337*n*, data is erased in units of blocks. The storage area of each block is divided into a plurality of pages. The NAND memory 337*n* is accessed by the logical host LH, and data writing, erasing, reading, and the like are executed in units of pages.

Figure 7:
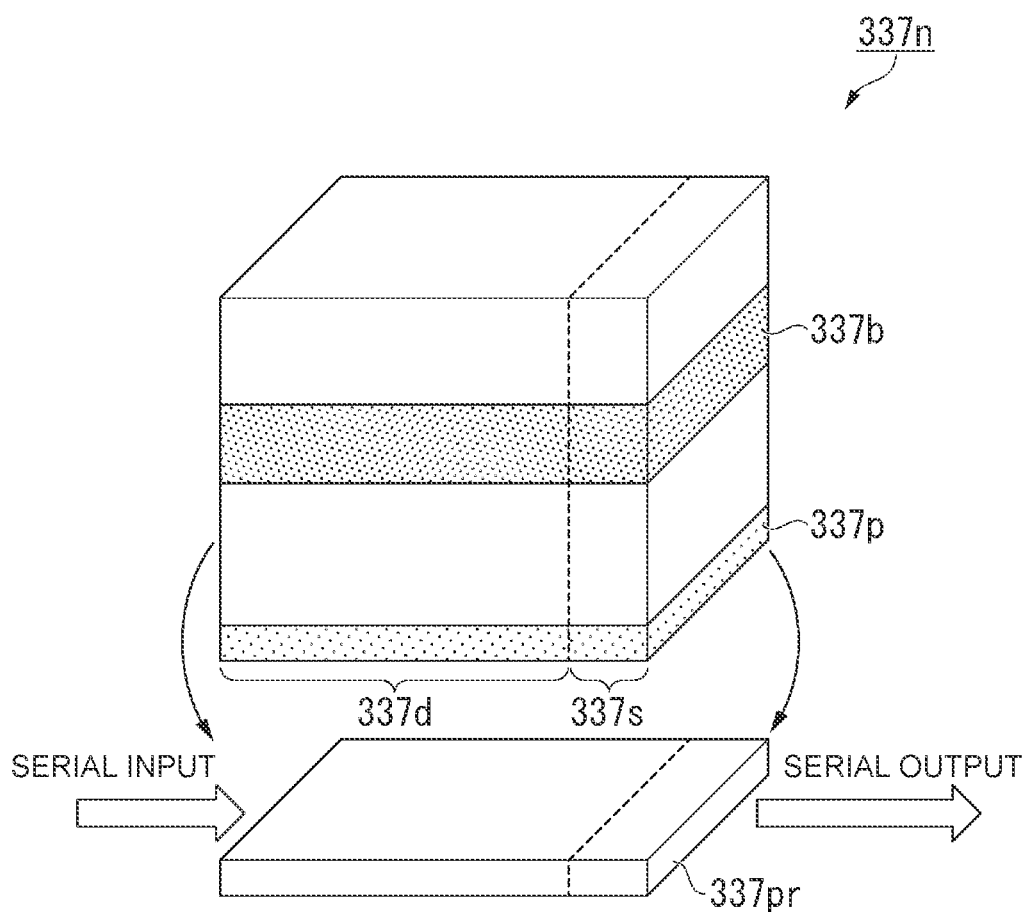
FIG. 7 is a diagram illustrating a configuration example of a NAND memory according to one or more embodiments.

FIG. 7 is a diagram illustrating a configuration example of the NAND memory 337*n* according to one or more embodiments. In the example of FIG. 7, the NAND memory 337*n* includes 2048 blocks 337*b* and one page register 337*pr*. The 2048 blocks 337*b* are stacked, forming a single memory array as the entire NAND memory 337*n*. One block 337*b* can store 64 pages of data. One page 337*p* includes a data area 337*d* of 2048 bytes and a spare area 337*s* of 64 bytes. The page register 337*pr* has a storage area that can temporarily hold data to be read/written for one page and management data for that data. Data to be read/written, which is instructed by a host, is temporarily stored in the page register 337*pr* on a page-by-page basis. In the page register 337*pr*, data to be written is acquired by serial input from the host, and the acquired data is stored in an indicated page. Further, the page register 337*pr* temporarily stores data to be read from an indicated page. The stored data is output to a host by serial output.

The spare area 337*s* is a storage area provided as a spare. The spare area holds management data. The management data is data used to manage the data held in the data area. The management data may include, for example, error detection codes, bad block codes, and the like. The spare area may be used for temporary storage of user data or intermediate data that has unexpectedly increased in data volume. Specifications such as the storage capacity of each page, the number of pages per block, the number of blocks per memory array, and the like are not limited to the example in FIG. 7. These specifications may differ from model to model.

In the NAND memory 337*n*, new user data may be written to the free space of the NAND memory 337*n* according to a write command notified from the logical host LH. User data is treated as valid data at the time when the user data is written (which may be referred to as "valid data" in the present application). Further, a part of valid user data instructed by an erase command notified from the logical host LH is set as invalid (void) data. At this stage, the invalid data is not completely erased, and the logical address of the page where the invalid data is stored is erased from a mapping table. The invalid data is aggregated by the BGC into a specific unused block, and valid user data that has not been invalidated is aggregated into another specific unused block. Invalid data is erased by block erasing from a block where no valid user data has been left and the entire block has been occupied with invalid data. A block from which invalid data has been erased is released as free space.

The SoC 334 includes a host access controller 334*h* and a NAND access controller 334*n* (refer to FIG. 2). The SoC 334 may execute processing indicated by a command described in predetermined firmware to implement the functions of the host access controller 334*h* and the NAND access controller 334*n*.

The host access controller 334*h* mainly performs control of access by the logical host LH. The host access controller 334*h* manages the usage statuses of resources such as the DRAM 333, the NAND memory 337*n*, and the SoC 334. Based on the usage statuses of the resources, the host access controller 334*h* determines whether to execute commands from the logical host LH, and forwards commands that have been determined executable to the NAND access controller 334*n*. For example, a logical address of a free space of the NAND memory 337*n* is instructed as a resource available for writing data. A logical address of a page in which valid user data has been stored in the NAND memory 337*n* is instructed as a resource available for reading or erasing data.

The host access controller 334*h* uses the mapping table to manage the usage status of each page of the NAND memory 337*n*. In the mapping table, whether a logical address is described identifies whether each page is in use. When writing new data, the host access controller 334*h* maintains the logical address of the page on which the data has been written. When erasing data, the host access controller 334*h* erases the logical address of the page on which the data instructed to be erased is stored. At this stage, the data instructed to be erased remains stored, but the erasure of the logical address indicates that the stored data is invalid.

The host access controller 334*h* erases a block by the BGC, assigns a new logical address to the page from which stored data has been erased, and records the new logical address in the mapping table in association with the physical address of the page. This indicates that the page from which data has been erased is a valid page that enables new data to be written thereto. The host access controller 334*h* writes new data to an unused block, in which all pages are free spaces, and performs no writing to a block having even one page with valid data stored therein.

Figure 8:
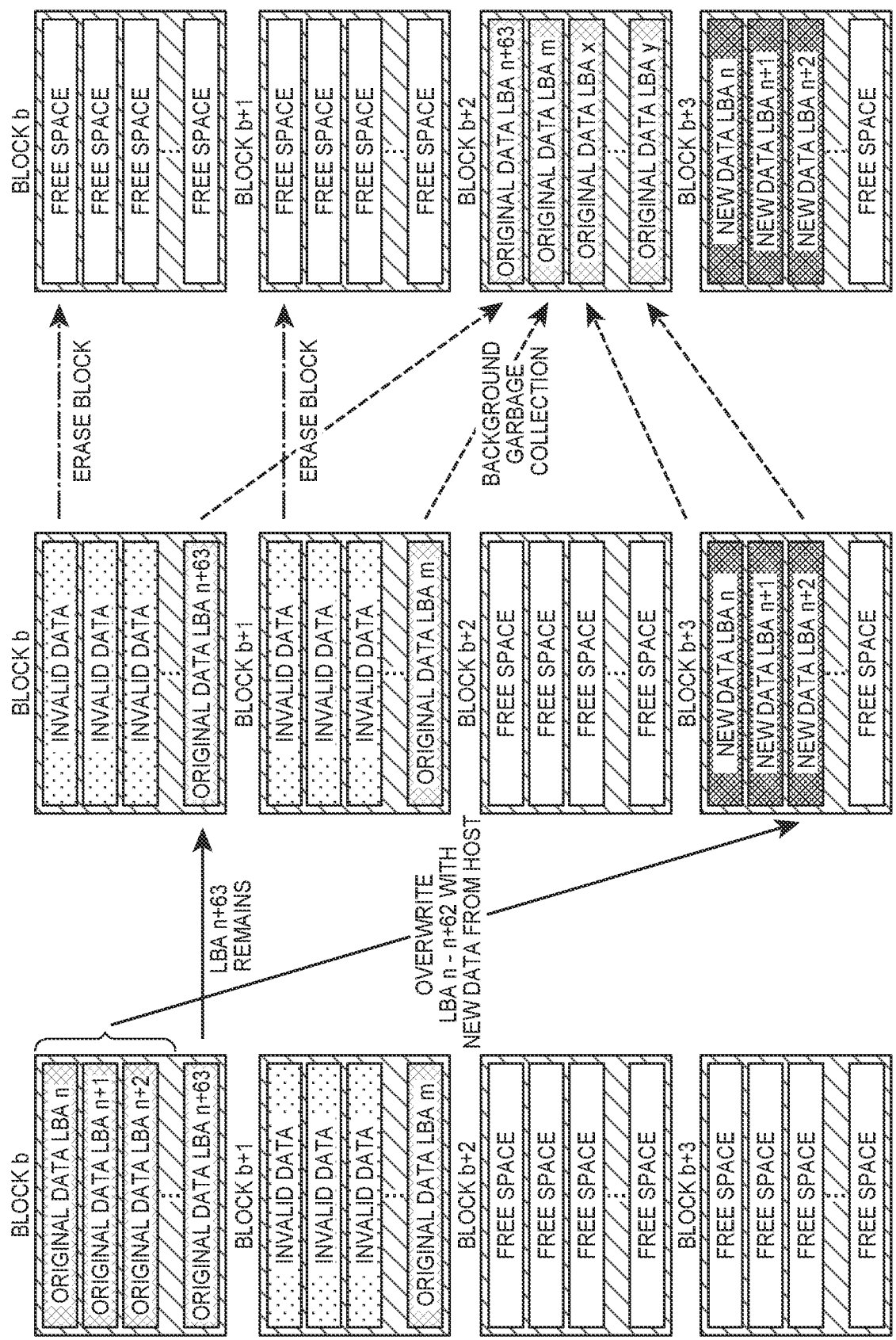
FIG. 8 is an explanatory diagram for explaining NAND memory management.

A description will now be given of an example of management of a storage area of the NAND memory 337*n* by the host access controller 334*h*. FIG. 8 is an explanatory diagram for explaining the management of the NAND memory 337*n*. It should be noted that, as illustrated by the left column in FIG. 8, a case is assumed where, in a situation in which 64 pages of data have been stored in block b, a host instructs overwriting the area of logical addresses LBAn to n+62 with 63 pages of new data. The overwriting of data includes the processing of erasing the existing data and the processing of storing the new data.

In this case, data stored in the area at logical addresses LBAn to n+62 is treated as invalid data, while data stored on the page indicated by a logical address LBAn+63 continues to be stored as valid data. New data cannot be written to block b, so that new data is written to block b+3 as an other unused block. The amount of data to be read and written is not necessarily in units of blocks, so that invalid data is left. New data cannot be written to blocks having invalid data left. Repeated reading and writing of data inconveniently increase the number of unusable blocks.

The host access controller 334*h* controls the execution of BGC on the basis of the power state information notified from the logical host LH (refer to FIG. 2). As will be described later, the power state information includes the power state information indicating the power states of the host devices. The power state information includes the operation modes of the host devices, and the information of the mode of power supplied to the constituent members of the information processing apparatus 10. When the power supply mode is the first power supply mode (AC mode), the host access controller 334*h* performs the BGC regardless of the operation modes of the host devices. When the power supply mode is the second power supply mode (battery mode) and a change to the power saving mode, which is an operation mode having less power consumption than the standard power consumption, is instructed as the operation mode, it is determined whether the BGC for the NAND memory 337*n* is necessary.

The host access controller 334*h* may determine whether the BGC is necessary on the basis of the capacity of the free space of the NAND memory 337*n* when the power supply mode is the second power supply mode (battery mode). The host access controller 334*h* can identify the capacity of a free space by referring to the mapping table to determine unused pages with no data stored therein as the free space, and counting the number of blocks including those pages.

When the information of the power supply mode is not included in the power state information, the host access controller 334*h* may estimate whether the first power supply mode or the second power supply mode has been selected as the power supply mode in the power circuit 29 on the basis of a temperature indicated by temperature data from the temperature sensor 338.

When the second power supply mode is being notified, the power state information may further include the information of remaining battery level of the battery 34. At this time, the host access controller 334*h* may determine whether the BGC is necessary on the basis of the additionally notified remaining battery level.

More specifically, if the notified remaining battery level is lower than a predetermined remaining level lower limit, then the host access controller 334*h* determines that the BGC is unnecessary.

Further, if the notified remaining battery level is equal to or higher than the remaining level lower limit, and the capacity of the free space of the NAND memory 337*n* is equal to or more than the predetermined capacity lower limit, then the host access controller 334*h* determines that the BGC is unnecessary.

Further, if the notified remaining battery level is equal to or higher than the remaining level lower limit, and the capacity of the free space of the NAND memory 337*n* is less than the predetermined capacity lower limit, then the host access controller 334*h* determines that the BGC is necessary.

The host access controller 334*h* may perform the access control instructed by the logical host LH and the BGC in parallel. When performing the BGC, the host access controller 334*h* aggregates invalid data distributed across a plurality of blocks into a specific unused block. When aggregating the invalid data, the host access controller 334*h* duplicates the invalid data stored on a page of an aggregation source onto a page forming a free space of an aggregation destination. Then, in the mapping table, the host access controller 334*h* duplicates the logical address of the page of the aggregation source in association with an unused page of the aggregation destination, and erases the logical address of the page of the aggregation source.

For example, as illustrated in the left column of FIG. 8, a case is assumed where, under the condition that 64 pages of data have been stored in block b, a host instructs to overwrite an area of logical addresses LBAn to n+62 with 63 pages of new data. Overwriting corresponds to the processing of updating the existing data on a page indicated by an indicated logical address to new data. In this case, the data stored in the area of the logical addresses LBAn to n+62 is treated as invalid data, while the data stored in the page indicated by the logical address LBAn+63 continues to be stored as valid data. The new data cannot be written to the area of the logical address LBAn to n+62 in block b, so that the new data is written to block b+3, which is an other unused block. The logical addresses of the pages to which the new data is written is updated to indicated logical addresses LBAn to n+62. Meanwhile, the logical addresses LBAn to n+62 of block b in which invalid data is stored is erased from the mapping table.

The host access controller 334h may preferentially select a block with less invalid data or a block with less valid data as an aggregation source block (refer to FIG. 2). The host access controller 334h can count the amounts of valid data and invalid data by referring to the mapping table and counting, for each block, the number of pages for which logical addresses have been set.

Then, in the BGC, the host access controller 334h performs block erase on a block in which invalid data has been stored on all pages and no pages with valid data stored thereon exist, and frees (releases) all pages of that block as an unused free space. The host access controller 334h issues a new logical address for each page that has undergone the block erase, and stores the issued logical address in association with the physical address of that page.

The middle column in FIG. 8 illustrates a case where the data stored at the logical address LBAn+63 of block b, the logical address LBAm of block b+1, and the logical addresses LBAx and LBAy of an other block is aggregated in a free space of block b+2. In this example, the data stored in an original page becomes invalid data. Further, valid data no longer exists in blocks b and b+1, and all data stored becomes invalid. Then, the data stored in each of blocks b and b+1 is erased (block erase), thus allowing new data to be written therein as a free space.

The host access controller 334h refers to a firmware log stored in the DRAM 333 to generate a statistical log indicating the operating state of the SSD, and sends the generated statistical log to the logical host LH (refer to FIG. 2). The statistical log describes information that statistically indicates the state of the SSD. Such information includes, for example, the number of input/output accesses to the NAND memory 337n per predetermined unit time, the used storage capacity in the NAND memory 337n, and the like. As the used storage capacity, the total storage capacity of the storage area that stores valid user data and the storage area that stores invalid data may be calculated. The host access controller 334h may generate and notify a statistical log in response to a log request command received from the logical host LH, or autonomously generate a statistical log at a predetermined time or time interval and notify the generated statistical log.

The host access controller 334h sends temperature data input from the temperature sensor 338 to the EC 31 according to a predetermined method. The host access controller 334h may include, for example, the temperature data in SMART (Self-Monitoring and Reporting Technology) data. The SMART data may be configured to include a statistical log. The temperature data is used by the temperature control function of the EC 31.

The NAND access controller 334n mainly controls the access to the NAND memory 337n. According to a command notified from the logical host LH via the host access controller 334h, the NAND access controller 334n accesses the NAND memory 337n and performs processing instructed by the command. The command may instruct processing of referring to stored data files and the names, capacities, directory structures and the like thereof, opening or closing data files, writing data, reading data, and erasing data.

The NAND access controller 334n may protect predetermined types of resources on a read-only basis from an issued command. In other words, if data instructed to be erased or modified by a command belongs to a predetermined type of resource, then the NAND access controller 334n does not perform erasure or modification as the processing instructed by the command. The predetermined types of resources may include resources, the erasure or modification of which may impair the functionality of the information processing apparatus 10. Such resources include, for example, system files, folders, and registry keys installed as part of an OS (Operating System).

Figure 3:
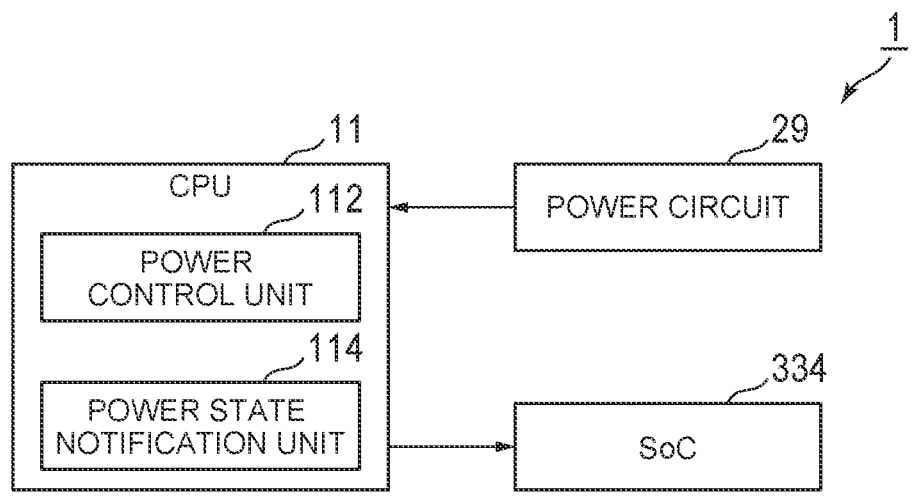
FIG. 3 is a block diagram illustrating a first functional configuration example of the information processing apparatus according to one or more embodiments.

A description will now be given of the functional configuration example of the information processing apparatus 10 according to one or more embodiments. FIG. 3 is a schematic block diagram illustrating the functional configuration example of the information processing apparatus 10 according to one or more embodiments. The information processing apparatus 10 includes a power control unit 112, a power state notification unit 114, the power circuit 29, and the SoC 334. In the example of FIG. 3, the functions of the power control unit 112 and the power state notification unit 114 are implemented in the CPU 11. The CPU 11 may implement the functions of the power control unit 112 and the power state notification unit 114 by executing predetermined programs. In order to implement the function of the power control unit 112, the CPU 11 may execute, for example, a program described as an API function or may be provided with a dedicated integrated circuit. The CPU 11 may execute, for example, a predetermined device driver to implement the function of the power state notification unit 114.

The power control unit 112 determines the operation mode of a host device on the basis of one or both of the operating state of the host device and the control state with respect to the information processing apparatus 10. For example, the power control unit 112 uses a publicly known method to determine one stage of operation mode among a plurality of stages of operation modes that the CPU 11, which serves as the host device, can take, and causes the CPU 11 to operate in accordance with the determined operation mode. In the power control unit 112, a transition condition is set in advance for an operation mode after a change, and when the operation state or the control state satisfies the set transition condition, the operation mode is changed to an operation mode corresponding to the transition condition. The plurality of stages of operation modes include at least a standard mode and a power saving mode. The power saving mode is an operation mode in which the rated power, which is the rated value of power consumption, is lower than that in the standard mode, and is a state in which the system is not completely stopped. The power control unit 112 can, for example, apply a D0 mode in PCIe (registered trademark) as the standard mode, and apply a D3 mode and a D4 mode as the power saving mode. The power control unit 112 can, for example, apply an S0 state in ACPI as the standard mode, and apply an S3 state and an S4 state as the power saving mode.

The power control unit 112 may use a publicly known method to determine the operation mode of the CPU 11 serving as a host device. The power control unit 112 changes the operation mode from the standard mode to the power saving mode when a state in which the power consumption of the CPU 11 is equal to or less than a lower limit in the standard mode continues for a certain period of time or longer, or when a state in which no control signal is input from the input device 27 continues for a certain period of time or longer. When the state in which the power consumption of the CPU 11 exceeds the lower limit in the standard mode continues for a certain period of time or longer, or when a control signal is input from the input device 27, the power control unit 112 changes the operation mode from the power saving mode to the standard mode. At the timing when a change to a determined operation mode takes place, the power control unit 112 outputs the operation mode information indicating the determined operation mode to the power state notification unit 114 and the EC 31. In the EC 31, for example, the operation mode information may be used to control the operation of the heat dissipation fan 28 and the operating voltage of each member. The operation amount of the heat dissipation fan 28 is controlled so as to be greater in operation modes with more power consumption.

The power state notification unit 114 receives the power supply mode information, which is transmitted by power state signals, from the power circuit 29 via the EC 31. When the operation mode information is input from the power control unit 112, the power state notification unit 114 aggregates the input operation mode information and power supply mode information, and outputs the aggregated information to the SSD 33 as power state information. The power state notification unit 114 may be notified of the electromotive force transmitted by an electromotive force signal from the power circuit 29 via the EC 31, and may estimate the remaining battery level of the battery 34 from the transmitted electromotive force by using a publicly known function that indicates the relationship between electromotive force and battery capacity. The power state notification unit 114 may include the information of the estimated remaining battery level in the power state information and output the power state information to the SoC 334 of the SSD 33. The power state notification unit 114 may output the power state information by using, for example an IOCTL interface. The power state notification unit 114 can set the power state information as part of the operating parameters of the SoC 334 as a device connected to itself through the IOCTL interface. The output power state information is used for controlling the execution of the BGC.

Figure 4:
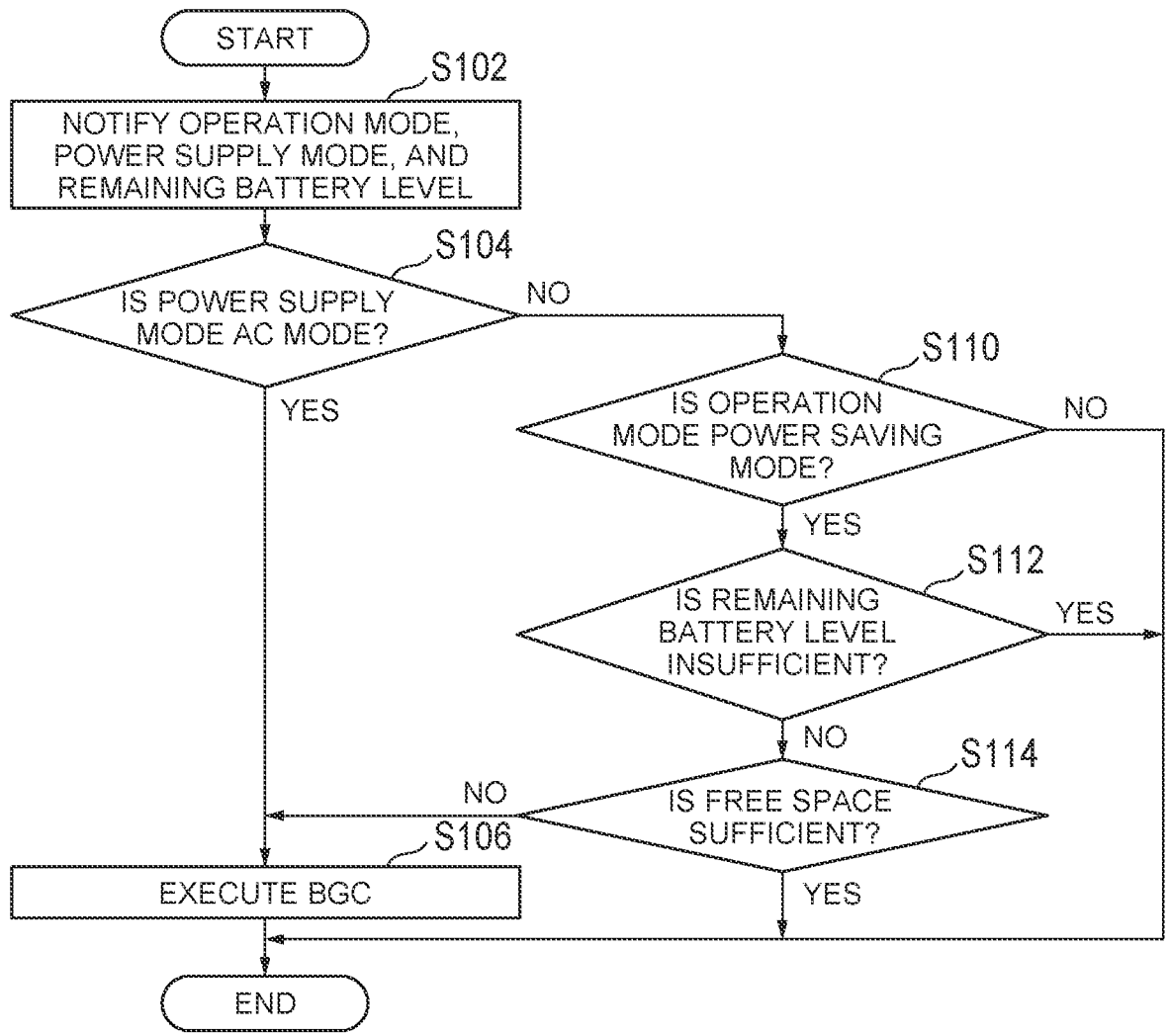
FIG. 4 is a flowchart illustrating a BGC control example according to one or more embodiments.

A description will now be given of an example of the BGC control according to one or more embodiments. FIG. 4 is a flowchart illustrating the example of the BGC control according to one or more embodiments.

(Step S102) The power state notification unit 114 acquires the information of the operation mode of a host device, the information of the mode of power supply to a constituent member, and the information of the remaining battery level of the battery 34, and notifies these information to the SoC 334 of the SSD 33 as the power state information.

(Step S104) The host access controller 334h of the SoC 334 determines whether the notified power supply mode is the first power supply mode (AC mode). If the notified power supply mode is the first supply mode (AC mode) (YES in step S104), then the procedure proceeds to the processing in step S106. If the notified power supply mode is the second power supply mode (battery mode) (NO in step S104), then the procedure proceeds to the processing in step S110.

(Step S106) The host access controller 334h executes the BGC. Thereafter, the processing in FIG. 4 is terminated.

(Step S110) The host access controller 334h determines whether the notified operation mode has been changed to the power saving mode. If the operation mode has been changed to the power saving mode (YES in Step S110), then the procedure proceeds to the processing in Step S112. If the operation made has not been changed to the power saving mode (NO in Step S110), then the procedure does not perform the BGC and terminates the processing in FIG. 4.

(Step S112) The host access controller 334h determines whether the notified remaining battery level is insufficient on the basis of whether the notified remaining battery level is below a predetermined remaining battery level lower limit (e.g., 10% of the battery capacity when fully charged). If the remaining battery level is determined to be insufficient (YES in Step S112), then the BGC will not be executed unless it is determined that the free space of the NAND memory 337n is absolutely insufficient (e.g., below 1% of the total storage area), and the processing in FIG. 4 will be terminated. If it is determined that the free space of the NAND memory 337n is absolutely insufficient (e.g., below 1% of the total storage area), then the host access controller 334h executes the BGC until the absolute lower limit of the free space (e.g., 1% of the total storage area) is reached, and terminates the processing in FIG. 4. If the remaining battery level is determined to be sufficient (NO in Step S112), then the procedure proceeds to Step S114.

(Step S114) The host access controller 334h determines whether the free space of the NAND memory 337n is sufficient on the basis of whether the capacity of the free space is equal to or more than a predetermined free space normal lower limit (e.g., 10%). If the free space is determined to be sufficient (YES in Step S114), then the host access controller 334h will not execute the BGC and terminates the processing in FIG. 4. If the free space is determined to be insufficient (NO in Step S114), then the procedure proceeds to the processing in Step S106 to execute the BGC until a predetermined termination condition is satisfied, and terminates the processing in FIG. 4. As a termination condition, either the free space exceeding the normal lower limit, or garbage, i.e., invalid data, no longer existing may be applied.

Modified Example

Figure 5:
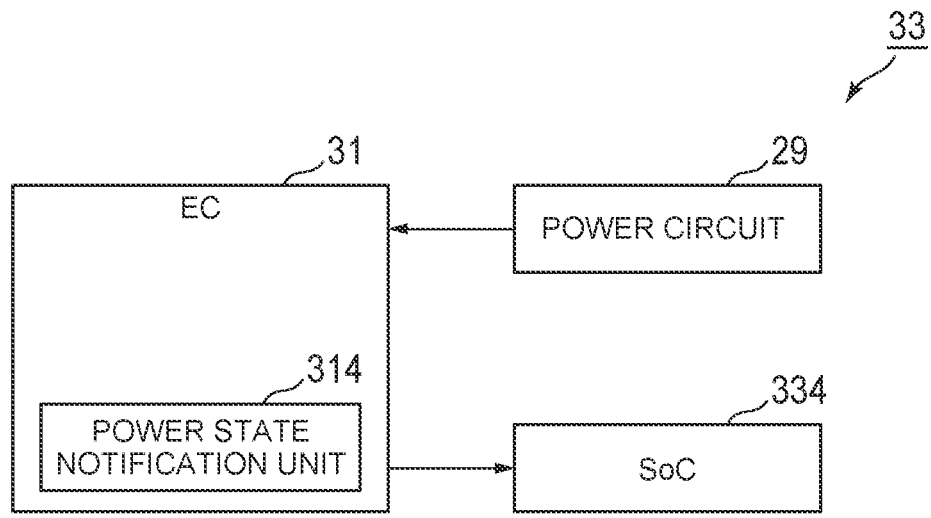
FIG. 5 is a block diagram illustrating a second functional configuration example of the information processing apparatus according to one or more embodiments.

The information processing apparatus 10 according to one or more embodiments may be modified as described below. FIG. 5 is a block diagram illustrating a second functional configuration example of an information processing apparatus 10 according to one or more embodiments.

The information processing apparatus 10 includes a power state notification unit 314 in place of the power state notification unit 114, and further includes a power circuit 29 and a SoC 334. In the example of FIG. 5, an EC 31 implements the function of the power state notification unit 314. The EC 31 performs the processing instructed by a command described in predetermined firmware to implement the function of the power state notification unit 314.

The power state notification unit 314 receives power supply mode information transmitted by a power state signal from the power circuit 29. When operation mode information is input from a power control unit 112 (FIG. 3), the power state notification unit 314 aggregates the input operation mode information and power supply mode information, and outputs the aggregated information to an SSD 33 as the power state information. The power state notification unit 314 may be notified of an electromotive force transmitted by an electromotive force signal from the power circuit 29, and may estimate the remaining battery level of a battery 34 from the electromotive force transmitted using the above-described method. The power state notification unit 314 may include the information of the estimated remaining battery level in the power state information, and output the power state information to the SoC 334 of the SSD 33. The power state notification unit 314 may output the power state information by using, for example, an SMbus (registered trademark) interface. The power state notification unit 314 can send the power state information by using a polling packet, and acquire, from the SoC 334, SMART data including temperature data as a response thereto.

Figure 6:
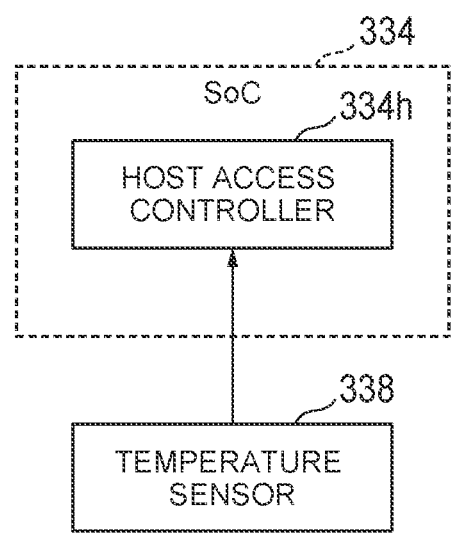
FIG. 6 is a block diagram illustrating a third functional configuration example of the information processing apparatus according to one or more embodiments.

FIG. 6 is a block diagram illustrating a third functional configuration example of the information processing apparatus 10 according to one or more embodiments. The example of FIG. 6 does not include the power state notification unit 114 or 314, and a host access controller 334h of the SoC 334 monitors the temperature data input from a temperature sensor 338 and estimates whether the mode of power supply by the power circuit 29 is a first power supply mode or a second power supply mode on the basis of the monitored temperature data. The host access controller 334h uses the estimated power supply mode and the operation mode information notified from a host device to control the execution of the BGC according to the above-described method. At this time, the power state information notified from the logical host LH may not include the power supply mode information.

If a state in which, for example, the moving average value of the SSD temperature indicated in the temperature data exceeds a predetermined reference temperature (e.g., 40 to 50[° C.]), continues for a certain duration (e.g., 10 to 180 [seconds]) or longer, then the host access controller 334h estimates that the mode of power supply by the power circuit 29 is the first power supply mode. The host access controller 334h otherwise estimates that the mode of power supply by the power circuit 29 is the second power supply mode. This is because, in the second power supply mode, access to the SSD 33 is suppressed or stopped more frequently than in the first power supply mode in order to suppress power consumption at a host device. Further, the more frequently the SSD33 is accessed by the host device or the larger the amount of data involved in the access, the more power is consumed to perform more processing, leading to a larger amount of generated heat.

Not limited to the case illustrated in FIG. 6, there are cases where the host access controller 334h cannot acquire information of the remaining battery level. In such a case, in the processing illustrated in FIG. 4, the processing in Step S112, which requires information of the remaining battery level, is omitted. Then, when the operation mode is set to the power saving mode in Step S110 (YES in Step S110), the procedure can proceed to the processing in Step S114.

As described above, the information processing apparatus 10 according to one or more embodiments includes the power circuit 29 and an other constituent member, the constituent member including at least a first controller and a solid-state memory (e.g., the SSD 33), and the solid-state memory including a second controller (e.g., the SoC 334) and a storage medium (e.g., the NAND memory 337n). The power circuit 29 supplies operating power, which is the power used to operate the constituent member, and the power circuit 29 selects the first power supply mode (e.g., the AC mode) for converting power into the operating power when the power is supplied from an external power source, and selects the second power supply mode (e.g., the battery mode), in which the power from a secondary battery (e.g., the battery 34) is converted into the operating power when the power is not supplied from an external power source. The second controller executes garbage collection (e.g., BGC) for a storage medium regardless of an operation mode notified from the first controller when the first power supply mode is selected, and determines whether the garbage collection for the storage medium is necessary when the second power supply mode is selected and a change to a power saving mode, which has less power consumption than standard power consumption, is instructed as the operation mode.

The first controller may be either a host system processor (e.g., the CPU 11) or a controller (e.g., the EC 31) that is separate from the host system processor. The first controller may notify the second controller of the power supply mode of the power circuit and the remaining battery level of the secondary battery.

With this configuration, when AC power is supplied from an external power source, the garbage collection is executed regardless of power consumption based on an operation mode, thus achieving effective use of a storage medium. When AC power is not supplied from an external power source and the operation mode is changed to the power saving mode, in which power consumption is less than standard power consumption, it is determined whether the garbage collection is necessary. Consequently, in the power saving mode, in which power consumption is less, the need for garbage collection is low, and the impact on the battery life of a secondary battery can be reduced by determining whether garbage collection, which consumes much power, is necessary.

When the second power supply mode is selected, the second controller may determine whether garbage collection for a storage medium is necessary on the basis of the capacity of the free space of the storage medium.

With this configuration, whether the garbage collection for a storage medium is necessary can be quantitatively determined on the basis of the capacity of the free space of the storage medium.

The solid-state memory may include a temperature sensor (e.g., the temperature sensor 338) detecting the temperature of the solid-state memory, and the second controller may estimate, on the basis of the temperature detected by the temperature sensor, whether the first power supply mode or the second power supply mode has been selected.

This configuration enables the second controller provided in the solid-state memory to autonomously determine whether garbage collection is necessary. In a logical host connected to the sold-state memory, it is no longer necessary to provide a configuration for setting the information of the power supply mode. This enables economical implementation.

When the second power supply mode is selected and the remaining capacity of the secondary battery (e.g., the remaining battery level) is notified from the first controller, the second controller may determine whether garbage collection is necessary further on the basis of the remaining capacity.

With this configuration, whether the garbage collection for a storage medium is necessary can be quantitatively determined on the basis of the remaining capacity of the secondary battery.

The second controller may determine that garbage collection is unnecessary when the remaining capacity is less than a predetermined remaining capacity lower limit.

With this configuration, when the remaining capacity is insufficient, garbage collection, which consumes much power, is not performed, thus making it possible to prioritize the operation of the information processing apparatus 10 under limited power.

The second controller may determine that garbage collection is unnecessary when the remaining capacity is equal to or more than a predetermined remaining capacity lower limit and the capacity of the free space of the solid-state memory is equal to or more than a predetermined capacity lower limit, and may determine that garbage collection is necessary when the remaining capacity is equal to or more than the lower limit and the capacity of the free space is less than the lower limit.

With this configuration, when the remaining capacity is sufficient, whether garbage collection is necessary is determined on the basis of whether the capacity of a free space is insufficient. Thus, whether garbage collection is necessary is quantitatively determined on the basis of the capacity of the free space.

The above has described the one or more embodiments of the present invention in detail with reference to the accompanying drawings; however, specific configurations are not limited to those of the above-described one or more embodiments, and include designs and the like within a scope not departing from the gist of the present invention. The configurations described in the above-described one or more embodiments can be freely combined.

For example, some of the devices such as the USB connector 24, the audio system 25, the network card 26, and the input device 27 connected to the chipset 21 and EC 31 in FIG. 1 may be omitted in whole or in part. Further, other devices may be connected to the information processing apparatus 10.

DESCRIPTION OF SYMBOLS

10 . . . information processing apparatus; 11 . . . CPU; 12 . . . main memory; 13 . . . GPU; 14 . . . display; 21 . . . chipset; 22 . . . BIOS memory; 24 . . . USB connector; 25 . . . audio system; 26 . . . network card; 27 . . . input device; 28 . . . heat dissipation fan; 29 . . . power circuit; 31 . . . EC; 32 . . . SSD port; 33 . . . SSD; 34 . . . battery; 35 . . . AC adaptor; 112 . . . power control unit; 114, 314 . . . power state notification unit; 332 . . . logical host IF; 333 . . . DRAM; 334 . . . SoC; 334$h$ . . . host access controller; 334$n$ . . . NAND access controller; 336 . . . I/O buffer; 337$n$ . . . NAND memory; and 338 . . . temperature sensor.

What is claimed is:

1. An information processing apparatus comprising:
a power circuit; and
another constituent member, the constituent member including at least a first controller and a solid-state memory, and the solid-state memory including a second controller and a storage medium,
wherein the power circuit supplies operating power, which is power used to operate the constituent member, the power circuit
selects a first power supply mode for converting the power into the operating power where power is supplied from an external power source, and
selects a second power supply mode for converting power from a secondary battery into the operating power where power is not supplied from an external power source,
the second controller
executes garbage collection for the storage medium regardless of an operation mode notified from the first controller where the first power supply mode is selected, and
determines whether garbage collection for the storage medium is necessary where the second power supply mode is selected and a change to a power saving mode, which is an operation mode having less power consumption than standard power consumption, is instructed as the operation mode,
the solid-state memory includes a temperature sensor that detects a temperature of the solid-state memory, and
the second controller estimates, based on the temperature, whether the first power supply mode or the second power supply mode has been selected.

2. The information processing apparatus according to claim 1,
wherein the second controller
determines whether garbage collection for the storage medium is necessary based on a capacity of a free space of the storage medium
where the second power supply mode is selected.

3. The information processing apparatus according to claim 1,
wherein the second controller
determines whether the garbage collection is necessary based on a remaining capacity
where the second power supply mode is selected and the remaining capacity of the secondary battery is notified from the first controller.

4. The information processing apparatus according to claim 3,
wherein the second controller
determines that garbage collection is unnecessary where the remaining capacity is less than a predetermined remaining capacity lower limit.

5. The information processing apparatus according to claim 3,
wherein the second controller
determines that garbage collection is unnecessary where the remaining capacity is equal to or more than a predetermined remaining capacity lower limit and a capacity of a free space of the solid-state memory is equal to or more than a predetermined capacity lower limit, and
determines that garbage collection is necessary where the remaining capacity is equal to or more than the predetermined remaining capacity lower limit and the capacity of the free space is less than the predetermined capacity lower limit.

6. The information processing apparatus according to claim 3,
wherein the first controller is a processor of a host system, and
notifies the second controller of a power supply mode of the power circuit and a remaining capacity of the secondary battery.

7. The information processing apparatus according to claim 3,
wherein the first controller is a controller separate from a processor of a host system, and
notifies the second controller of a power supply mode of the power circuit and a remaining capacity of the secondary battery.

8. A control method in an information processing apparatus including:
a power circuit and another constituent member,
the constituent member including at least a first controller and a solid-state memory, and
the solid-state memory including a second controller and a storage medium,
wherein the solid-state memory includes a temperature sensor that detects a temperature of
the solid-state memory,
the control method executing:
a first step in which
the power circuit supplies operating power used to operate the constituent member,
the power circuit
selects a first power supply mode for converting a power into the operating power where the power is supplied from an external power source, and
selects a second power supply mode for converting a power from a secondary battery into the operating power where the power is not supplied from an external power source; and
a second step in which
the second controller
executes garbage collection for the storage medium regardless of an operation mode notified from the first controller where the first power supply mode is selected, and
determines whether garbage collection for the storage medium is necessary where the second power supply mode is selected and a change to a power saving mode, which is an operation mode having less power consumption than standard power consumption, is instructed as the operation mode,
wherein the second controller estimates, based on the temperature, whether the first power supply mode or the second power supply mode has been selected.

* * * * *